United States Patent
Wozniak et al.

(10) Patent No.: US 6,257,360 B1
(45) Date of Patent: Jul. 10, 2001

(54) COMPRESSED GAS FUEL STORAGE SYSTEM

(75) Inventors: John J. Wozniak, Columbia, MD (US); Dale B. Tiller, Lincoln, NE (US); Paul D. Wienhold, Baltimore; Richard J. Hildebrand, Edgemere, both of MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/427,798

(22) Filed: Oct. 27, 1999

Related U.S. Application Data
(60) Provisional application No. 60/105,889, filed on Oct. 27, 1998.

(51) Int. Cl.[7] .......................................... B60P 3/22
(52) U.S. Cl. ........................... 180/69.5; 280/831; 280/834
(58) Field of Search ................. 180/69.5, 69.4; 280/830, 831, 832, 834

(56) References Cited

U.S. PATENT DOCUMENTS

| | | |
|---|---|---|
| 4,416,227 | 11/1983 | Imamura . |
| 4,978,148 | 12/1990 | Kosugi et al. . |
| 5,180,190 * | 1/1993 | Kerse et al. .......................... 280/830 |
| 5,518,272 * | 5/1996 | Fukayawa et al. ................. 180/69.5 |
| 5,577,630 | 11/1996 | Blair et al. . |
| 5,603,360 | 2/1997 | Teel . |
| 5,632,250 | 5/1997 | Kato et al.. . |
| 5,658,013 * | 8/1997 | Bees et al. ........................... 280/834 |
| 5,676,180 | 10/1997 | Teel . |
| 5,704,387 | 1/1998 | Sims . |
| 5,794,979 * | 8/1998 | Kusuga et al. ...................... 180/69.5 |
| 5,924,734 * | 7/1999 | Fukayawa et al. .................. 280/830 |
| 5,997,040 * | 12/1999 | Fukagawa et al. ................. 180/69.5 |

FOREIGN PATENT DOCUMENTS
0214811 * 10/1984 (DE) ...................................... 280/834

OTHER PUBLICATIONS

DOT –"Federal Motor Vehicle Safety Standards; Fuel System Integrity of Compressed Natural Gas Vehicles; Compressed Natural Gas Fuel Container Integrity"–12/19/94.
DOT –"Federal Motor Vehicle Safety Standards; Compressed Natural Gas Fuel Container"–12/28/94.
DOT –"Federal Motor Vehicle Safety Standards; Fuel System Integrity of Compressed Natural Gas Vehicles"–04/25/94.
Dept. of Energy –Advanced Automotive Technologies Annual Report to Congress –Fiscal Year 1996 (Mar. 1998).
INNGI/Lincoln Composites –ISS –Novel Compressed Natural Gas Storage System for Automotive Applications approx. Jan. 22, 1999.
Lincoln Composites –NGV Fuel Tank Inspection Guidelines 1994/1996.

(List continued on next page.)

Primary Examiner—Richard M. Camby
(74) Attorney, Agent, or Firm—Francis A. Cooch (57) ABSTRACT

A compressed gas vehicle fuel storage system comprised of a plurality of compressed gas pressure cells supported by shock-absorbing foam positioned within a shape-conforming container. The container is dimensioned relative to the compressed gas pressure cells whereby a radial air gap surrounds each compressed gas pressure cell. The radial air gap allows pressure-induced expansion of the pressure cells without resulting in the application of pressure to adjacent pressure cells or physical pressure to the container. The pressure cells are interconnected by a gas control assembly including a thermally activated pressure relief device, a manual safety shut-off valve, and means for connecting the fuel storage system to a vehicle power source and a refueling adapter. The gas control assembly is enclosed by a protective cover attached to the container. The system is attached to the vehicle with straps to enable the chassis to deform as intended in a high-speed collision.

33 Claims, 9 Drawing Sheets

OTHER PUBLICATIONS

NFPA 52 –Compressed Natural Gas (CNG) Vehicular Fuel Systems 1992 Edition.

Compressed Gas Association, Inc. –Pressure Relief Device Standards Part 1 –Cyclinders For Compressed Gas CGA S–1.1 –1994.

Proposed Revision To American National Standard For Basic Requirements For Compressed Natural Gas Vehicle (NGV) Fuel Containers –Mar. 1, 1995.

Basic Requirements For Compressed Natural Gas Vehicle (NGV) Fuel Containers –ANSI/AGA –NGV2–1992.

EnV'98 Alternative Fuel Vehicles Advanced Natural Gas Vehicle Project –Johns Hopkins University, J.J. Wozniak et al. EnV'Environmental Vehicles & Alternative Fuels Conf., Jun. 15–17, 1998, Ypsilanta, MI.

Advanced Natural Gas Vehicle Development –Johns Hopkins University, J.J. Wozniak et al., vol. 16 No. 1 (1995).

The Application of Scrimp Vartm Fabrication Technology To The Compressed Natural Gas Intergrated Storage System Wienhold, P. et a, SAMPE J., 34(1) (Jan/Feb 1998).

Development Of An Integrated Storage System For A Mid-Size Automobile, Johns Hopkins University, Dale Tiller et al., 26–28 May 1998 Cologne, Germany.

Advanced Natural Gas Vehicle Program Johns Hopkins University, J. Wozniak et al. (1997).

* cited by examiner

FIG.1
PRIOR ART

Gas cylinders mounted within trunk

FIG.2

ISS mounted under trunk floor pan

COMPRESSED GAS FUEL STORAGE SYSTEM

CROSS-REFERENCE TO RELATED APPLICATION

This application claims the benefit of prior filed copending U.S. provisional application Ser. No. 60/105,889, filed Oct. 27, 1998.

STATEMENT OF GOVERNMENTAL INTEREST

This invention was made with Government support under Contract No. DE-FG02-95CE50421 awarded by the Department of Energy. The Government has certain rights in the invention.

BACKGROUND OF THE INVENTION

1. Field of the Invention

The present invention relates to an integrated compressed gas fuel storage system for motor vehicles, called the Integrated Storage System (ISS), comprising a plurality of high pressure gas storage cylinders (hereinafter referred to as pressure cells), interconnected by a gas control assembly incorporating operational and safety controls all contained within a molded housing.

2. Background

Domestic oil production is declining due to U.S. oil reserves becoming more difficult to tap while demands on petroleum production escalate. Half of the U.S. oil supply is imported and the U.S. Department of Energy predicts a 60 percent deficiency by the year 2010. International oil companies relying on easily extracted foreign oil may meet the demand but at an unacceptable cost to the U.S. economy. The primary cause of the short fall is the motor vehicle. Current predictions indicate motor vehicles will proliferate globally from 500 million today to one billion by the year 2030. The solution is obvious, alternative fuels must be developed for motor vehicles.

It has been demonstrated that compressed gases such as hydrogen, propane, methane or natural gas are viable alternatives to petroleum as a fuel source for motor vehicles. Natural gas is one of the more interesting of the alternatives because it is a plentiful commodity in the United States and therefor inexpensive. As a result, more than 30,000 natural gas vehicles are currently in use in the United States. These vehicles have demonstrated low fuel costs and reduced engine maintenance while affording a significant reduction in exhaust emissions. Such vehicles have been restricted to fleet trucks, delivery vans, buses and taxis due to their limited range. The restrictions and limitations are caused by the space required for existing compressed gas fuel systems. This space penalty results in lost truck bed volume, automobile trunk volume and range. Furthermore, higher initial purchase prices are experienced due to the cost of the gas storage systems.

Compressed gas vehicle fuel systems traditionally consist of a single large cylinder or a series of smaller cylinders mechanically clamped together and rigidly mounted to the vehicle chassis. Numerous clamps, brackets, and redundant valves and safety devices are required to comply with federal law. Installation and maintenance costs are high.

Figure 1:
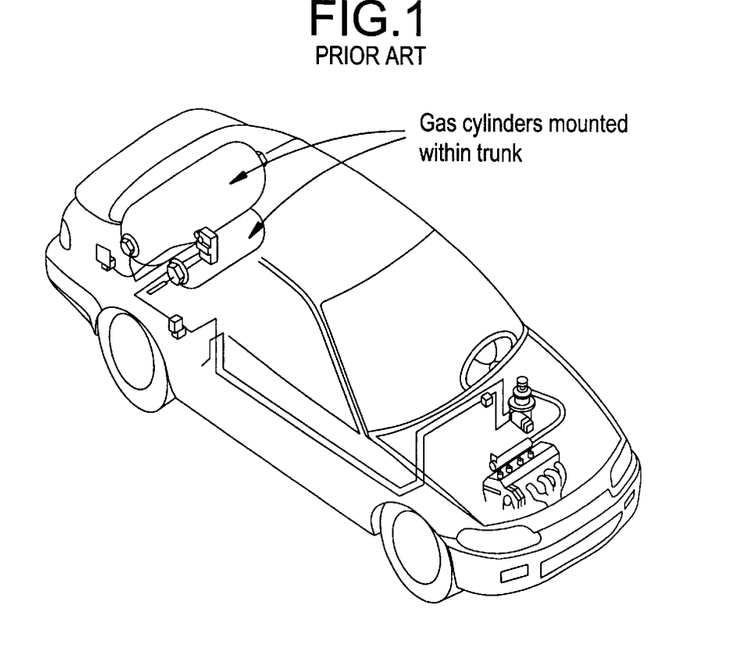
FIG. 1 depicts a typical prior art compressed natural gas fuel system installed in a vehicle.

An example of a contemporary compressed natural gas fuel system for an automobile is illustrated in FIG. 1. In this typical system, compressed natural gas storage cylinders reside in the trunk, taking up valuable cargo space, and numerous safety devices are redundantly incorporated throughout the fuel delivery system to insure that each tank has adequate safeguards to meet the applicable regulations. The size and/or number of tanks can be reduced, but this solution results in an unacceptable range limitation. The foregoing and related factors have hampered sales of light-duty natural gas powered vehicles and development of the industry.

SUMMARY OF THE INVENTION

The present invention utilizes the latest developments in materials and manufacturing processes to produce a compressed gas fuel storage system that avoids the limitations of current gas storage systems discussed above. Of critical importance, the invention includes the design of a lightweight, high strength storage system that meets or exceeds the safety requirements and application standards dictated by applicable governmental and industrial standards.

The compressed gas fuel storage system of the invention includes a plurality of composite over-wrapped cylinders (pressure cells), a unitizing, high strength outer shell with internal protective foam for the pressure cells, a central gas control assembly with interconnecting gas lines, a sealed, but removable for service, protective cover for the gas control assembly, and straps to secure the system to the vehicle.

The outer shell is an unstressed (un-pressurized), fire-resistant structure that serves the purpose of unitizing the plurality of pressure cells into a single container capable of withstanding physical abuse associated with motor vehicle applications. The outer shell and impact-absorbing foam contained therein serve to protect the pressure cells from impact loads. The gas control assembly protective cover and impact-absorbing foam contained therein serve to protect the gas control assembly from impact loads. The outer shell and the gas control assembly protective cover are fabricated from a fiberglass composite laminate. The outer shell, in conjunction with elastomeric gaskets and grommets, also serves to protect the pressure cells from exposure to water, road salt, automotive fluids (i.e. gasoline, motor oil, battery acid, antifreeze, brake fluid, etc.), and sunlight.

Only a single gas control assembly is needed to meet all safety standards because the plurality of pressure cells has been unitized into a single container. This gas control assembly includes a thermally activated pressure relief device, a manual service shut-off valve, an electric solenoid valve, and a port to connect the fuel storage system to the vehicle engine and the refueling adapter.

The compressed gas fuel storage system of the invention is designed such that it can be attached to the vehicle with straps which do not alter the structural compliance of the vehicle chassis in the event of a rear end collision. This is critical in light-duty vehicles which are designed to protect the passengers by absorbing collision energy through deformation of the chassis in non-passenger compartment regions of the vehicle (i.e. trunk and engine compartment regions).

Therefore, it is a primary objective of the present invention to provide a compressed gas fuel storage system for vehicles that is shaped in a near-rectangular or other non-cylindrical configuration to accommodate available chassis space and vehicle packaging constraints.

Another objective of the invention is to provide a compressed gas vehicle fuel storage system utilizing a single gas control assembly, including a thermally activated pressure relief device, a manual service shut-off valve, an electric solenoid valve, a port to connect the fuel system to a vehicle engine and refueling adapter, and a plurality of pressure cells contained within a molded housing.

A further objective of the present invention is to provide a compressed gas vehicle fuel. storage system which incorporates cylindrical pressure cells with near-hemispherical shaped domed ends.

A further objective of the present invention is to provide a compressed gas vehicle fuel storage system incorporating a plurality of pressure cells contained within a molded housing incorporating longitudinal triangular stiffeners between the pressure cells.

A still further objective of the invention is to provide a molded container for a plurality of pressure cells which is assembled using adhesives and/or fasteners to hold individually molded container segments together.

Another objective of the invention is to provide a molded gas control assembly protective cover for a compressed gas vehicle fuel system.

A further objective of the invention is to provide means to maintain ambient atmospheric pressure within a molded container which functions as a protective housing for a plurality of pressure cells.

A still further objective of the present invention is to provide mounting means for a plurality of pressure cells within a protective container that allows expansion and contraction of the fuel cells during the course of normal pressurization and depressurization operations without stressing the container.

A still further objective of the present invention is to provide means to enable said container to undergo penetration with a high-speed projectile without causing catastrophic rupture of the system, but allowing the gas to vent in a controlled manner.

A still further objective of the present invention is to provide a means of attaching a compressed gas vehicle fuel storage system to a vehicle by means of straps keeping said system fixed to the chassis under normal driving conditions but allowing the system to be displaced relative to the chassis in the event of a chassis crushing, high-speed collision.

Another primary objective of the present invention is to provide a compressed gas vehicle fuel storage system, which meets or exceeds government and industrial standards.

An objective of the present invention is to provide a compressed gas vehicle fuel storage system which meets or exceeds the standards developed by the National Fire Protection Association for compressed natural gas vehicle fuel systems as published in ANSI/NFPA 52, Compressed Natural Gas (CNG) Vehicular Fuel Systems, 1992, published by the American National Standards Institute and National Fire Protection Association and incorporated herein by reference.

Another objective of the invention is to provide a compressed gas vehicle fuel storage system which meets or exceeds the standards and revisions thereto developed by the Natural Gas Vehicle Coalition in 1992 and published in the American National Standard for Basic Requirements for Compressed Natural Gas Vehicle (NGV) Fuel Containers, ANSI/AGA NGV2-1992, and incorporated herein by reference.

A further objective of the invention is to provide a compressed gas vehicle fuel storage system which meets or exceeds the standards and revisions thereto published in the American National Standard for Basic Requirements for Compressed Natural Gas Vehicle (NGV) Fuel Containers, ANSI/AGA NGV2, as revised Mar. 1, 1995, and incorporated herein by reference.

A still further objective of the invention is to provide a compressed gas vehicle fuel storage system which meets or exceeds the standards and revisions thereto developed by the Compressed Gas Association, Inc. and published as Pressure Relief Device Standards, Part 1-Cylinders for Compressed Gasses, CGA S-1.1-1994, and incorporated herein by reference.

Another objective of the present invention is to provide a compressed gas vehicle fuel storage system which meets or exceeds the standards developed by the National Highway Traffic Safety Administration (NHTSA) of the Department of Transportation (DOT) and published by the National Highway Traffic Safety Administration as Federal Motor Vehicles Safety Standard, Standard No. 303, Fuel System Integrity of Compressed Natural Gas Vehicles, 1994, and incorporated herein by reference.

A further objective of the present invention is to provide a compressed gas vehicle fuel storage system which meets or exceeds the standards developed by the National Highway Traffic Safety Administration (NHTSA) of the Department of Transportation (DOT) and published by the National Highway Traffic Safety Administration as Federal Motor Vehicles Safety Standard, Standard 304, Compressed Natural Gas Fuel Containers.

DETAILED DESCRIPTION OF THE INVENTION

Figure 2:
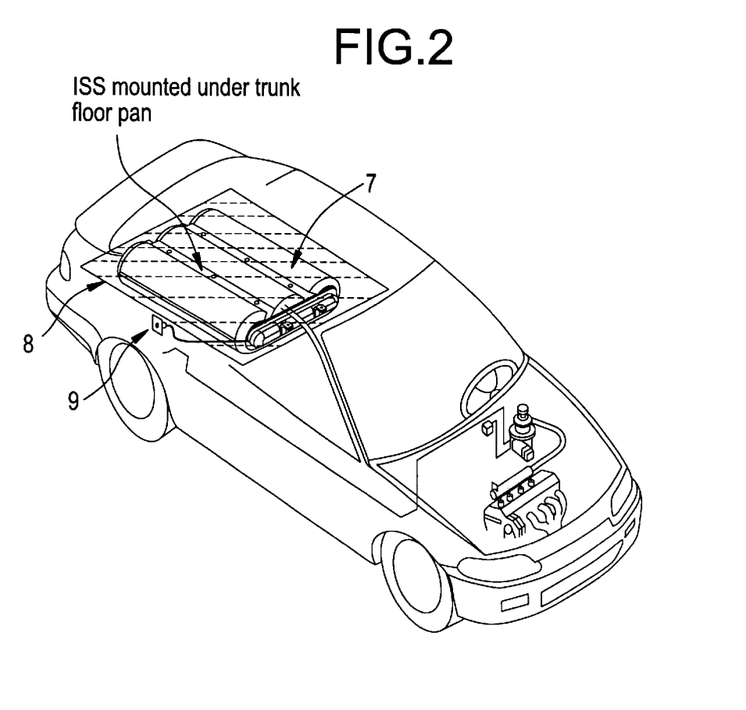
FIG. 2 illustrates an installation of the present invention in a light-duty vehicle.

The anticipated primary application of the present invention is a fuel storage container for automobiles, vans, and light duty trucks. Therefore, the preferred embodiment is presented in terms of an assembly, which fits in available chassis space and is installed in a manner similar to a conventional gasoline fuel tank. FIG. 2 illustrates a preferred embodiment, which is dimensioned and configured to be located within or beneath the vehicle. Comparing the prior art compressed gas fuel storage system of FIG. 1 with the integrated system of the current invention illustrated in FIG. 2, demonstrates that the integrated approach conserves cargo space. It allows the compressed gas integrated storage system, 7, to be installed under the chassis, 8, of a vehicle, with a refueling port, 9, in the same location as a gasoline fill port.

The invention, hereinafter referred to as the system, or ISS for integrated storage system, is designed to be used with compressed gases such as hydrogen, natural gas, natural gas/hydrogen mixtures, or any other gas, which is stored at high pressure and may be used as a fuel source in a vehicle. However, to simplify the presentation, the preferred embodiment of the invention is described in terms of a compressed natural gas (CNG) fuel storage system with a service pressure of up to 3600 psig.

Figure 3:
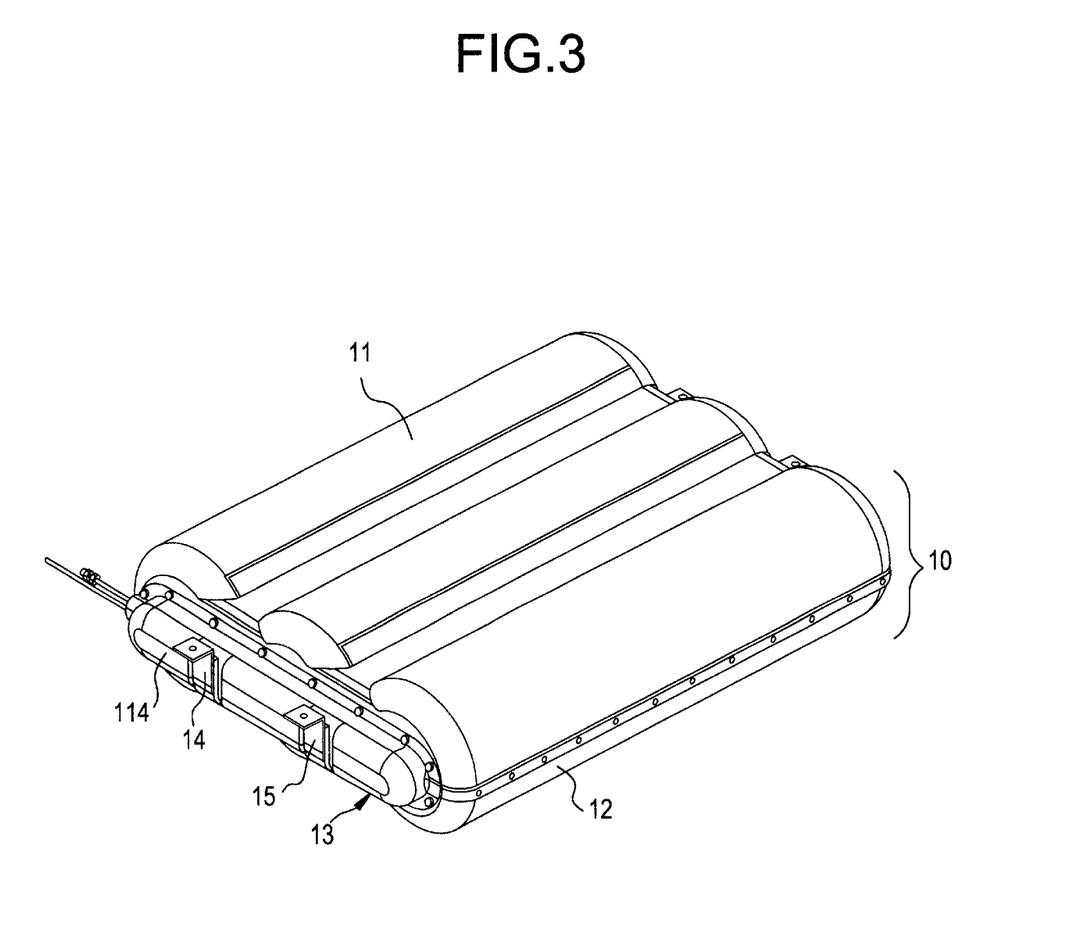
FIG. 3 is a perspective three-quarter view of the integrated compressed gas vehicle fuel storage system, comprising the invention, assembled and ready for installation in a vehicle.
Figure 4:
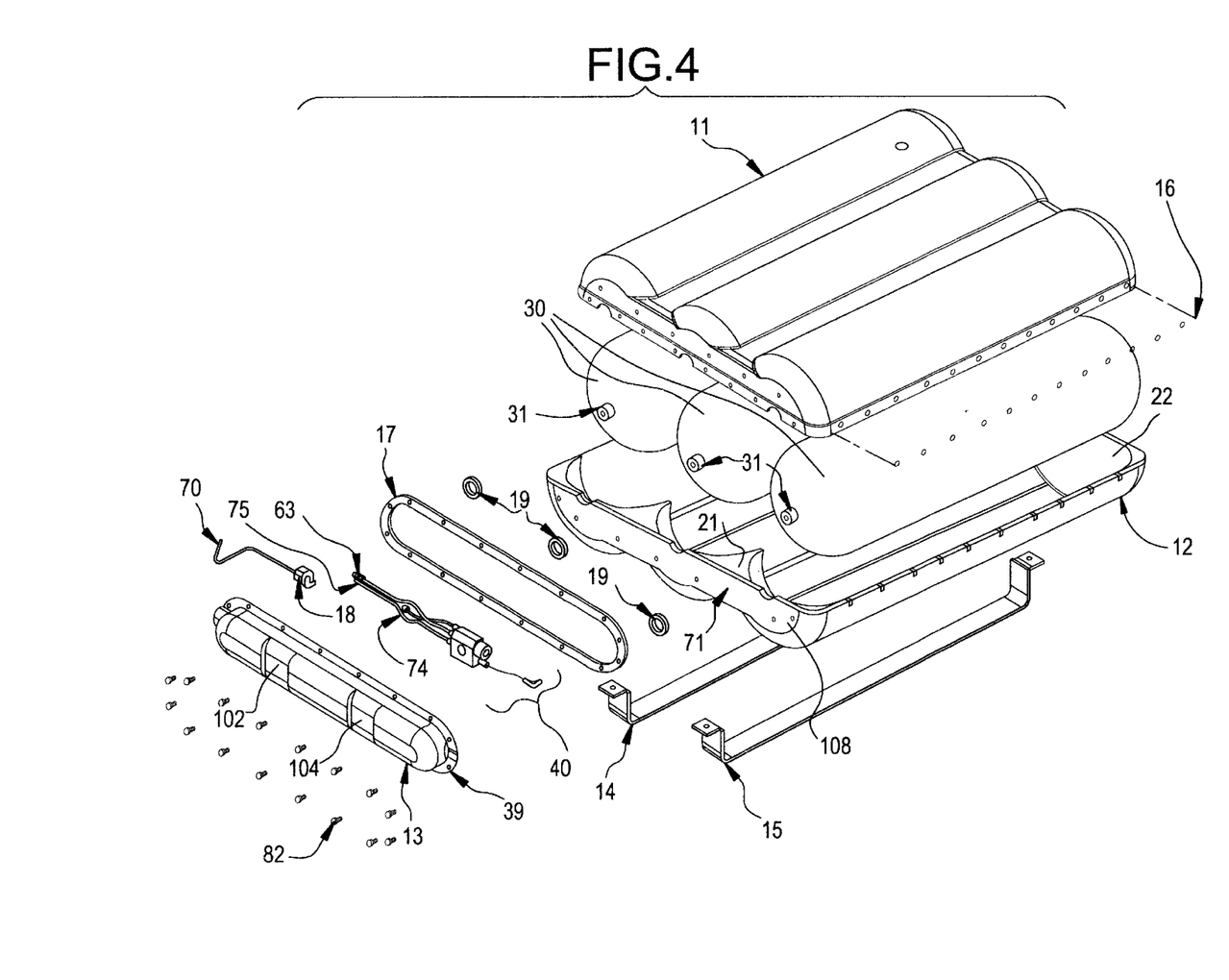
FIG. 4 is an exploded view of the invention.

The system is illustrated in FIG. 2 as it is typically installed in an automobile. It embodies the concepts of pressure containment, damage tolerance, and gas control. Referring now to FIGS. 3 and 4, these concepts are achieved by a plurality of compressed gas pressure cells, 30, of the type incorporating cylindrical bodies with domed ends, contained within a protective, unstressed outer shell, 10, comprised of the upper and lower shell sections, 11, 12, and a gas control assembly, 40, with a gas control assembly protective cover, 13.

The outer shell, 10, is a high strength, semi-rectangular box of molded fiberglass material, dimensioned to conform to the shape of the pressure cells. The shell is designed and manufactured to unitize the plurality of pressure cells into a single container that remains structurally intact under a variety of environmental conditions, abuses associated with mishandling in shipment and installation, and impacts from road debris and vehicle collision as required by FMVSS 303 and 304. The outer shell assists in allowing the ISS to meet or exceed all requirements of FMVSS 304 for tests, which include pressure cycling, bonfire, flaw tolerance, drop, pendulum impact and gunfire. The shell achieves its strength through the selection of its materials, its internal stiffeners located in the valley spaces between the pressure cells, and by means of its final assembly.

Threaded fasteners, 108, are located at the forward end of the upper and lower outer shell sections, 11, 12, of the outer shell, 10, to allow the gas control assembly protective cover, 13, to be fastened to the assembled upper, 11, and lower, 12, outer shell sections with mounting screws 82 (FIG. 4). In the preferred embodiment, stainless steel nut plates (not shown) are adhesive bonded to the inside surface of the upper and lower shells at the locations of the gas control assembly protective cover mounting screws.

The valley spaces between the pressure cells incorporate a longitudinal triangular stiffener, 23 (FIG. 5), in the shell, the stiffener being formed by fiberglass plies that surround a rigid foam insert that partially fills the valley for the fill length of the shell. The recessed surfaces formed by the bridge between the radiuses that meet in each valley provide a mounting location that allows all mounting devices to fit completely within the external envelope of the ISS. A pair of external mounting straps, 14, 15, work in conjunction with channel-shaped sections, 122, 124 (FIG. 5), attached to the vehicle to attach the unit to the chassis. These mounting components fit into the longitudinal valley spaces in the upper, 11, and lower, 12, shell sections of the outer shell, 10, providing a means of attaching the ISS to the vehicle and keeping the ISS in position under normal driving conditions, but allowing it to move relative to the chassis in the event of a high-speed rear end collision.

The configuration of the various components that form the integrated fuel storage system are illustrated by the exploded view of FIG. 4. The upper shell section 11 includes a lip, 16, which overlaps the upper edge of the lower shell section 12, providing an overlapping lip joint 44 (FIG. 5) whereby the upper section may be fastened to the lower section using an adhesive/sealant combined with screws, rivets or other fastening means. In the preferred embodiment, blind rivets are used to hold the sections together until an adhesive/sealant cures.

The ISS outer shell 10 has interior dimensions that permit the installation of shock absorbing, protective foam bumpers, 21, 22, surrounding and protecting the dome regions of the pressure cells, 30. The gas control assembly protective cover, 13, has interior dimensions that permit the installation of shock absorbing, protective foam bumpers, 78, 80 (FIG. 6), surrounding and protecting the gas control assembly, 40.

Figure 7:
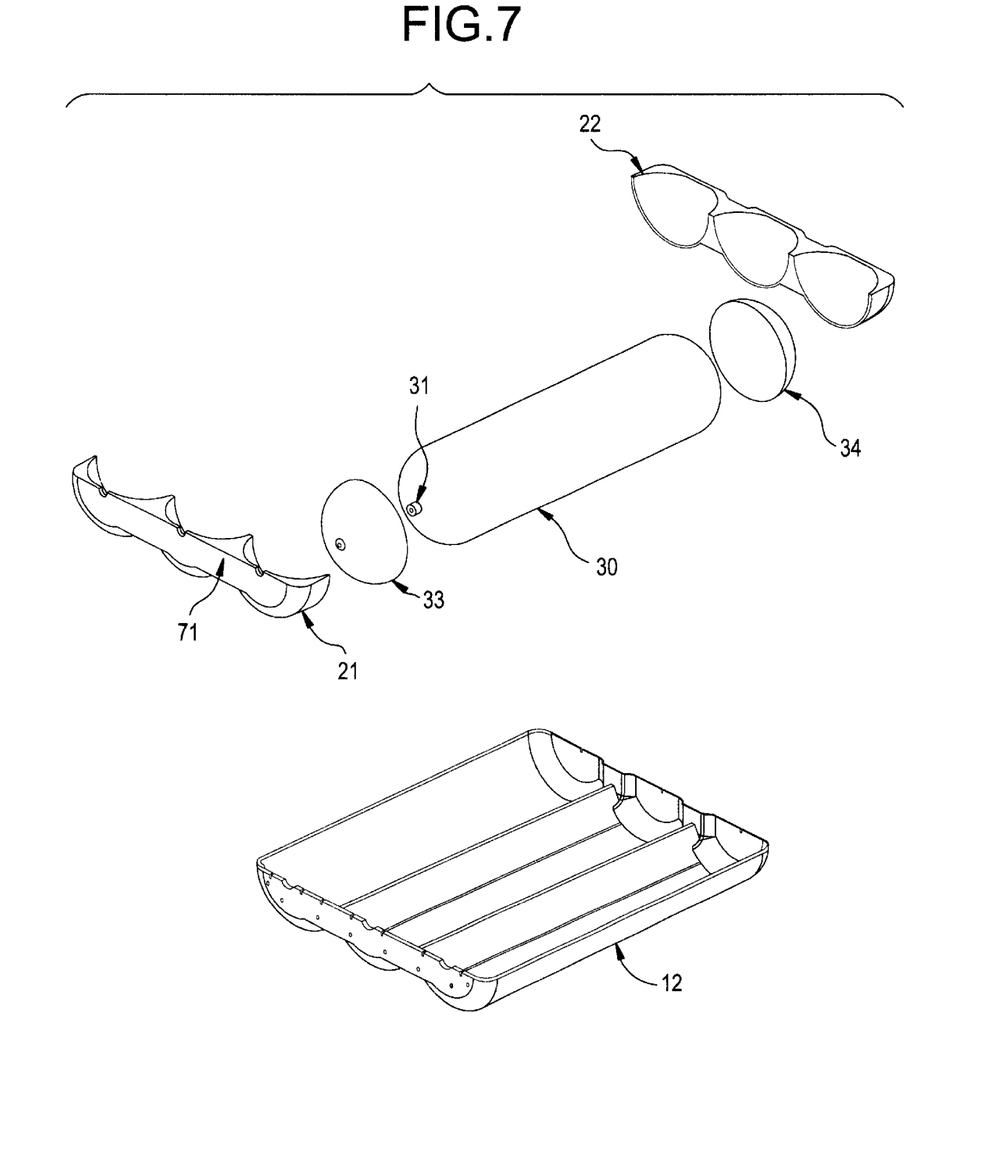
FIG. 7 is a perspective, three-quarter exploded view illustrating the lower shell section of the ISS container/outer shell, one of the pressure cells used by the system, and the foam bumpers and elastomeric caps that support and cushion the pressure cells.

The protective foam bumpers, 21, 22, are molded to the shape of the interior of the top, 11, and bottom, 12, shell sections and to conform to the shape of the pressure cell dome areas. These shock-absorbing bumpers act as protective supports for the domes of the pressure cells. The pressure cells are bound to the structure in the region of the domes only, through elastomeric interface caps 33, 34 (FIG. 7), consisting of rubber- or sponge-like material, and attached to both the pressure cells and the impact absorbing foam bumpers with an elastomeric adhesive. The cylindrical portions of each pressure cell do not make physical contact with each other or with the outer shell. This results in a radial air gap, 26 (FIG. 5), surrounding the cylindrical region of pressure cells which physically de-couples the pressure cells from each other. The air gap, 26, and the elastomeric interface caps, 33, 34, in the dome regions accommodate the dimensional growth of the pressure cells during pressurization caused by normal filling of the pressure cells.

Figures 5, 5A:
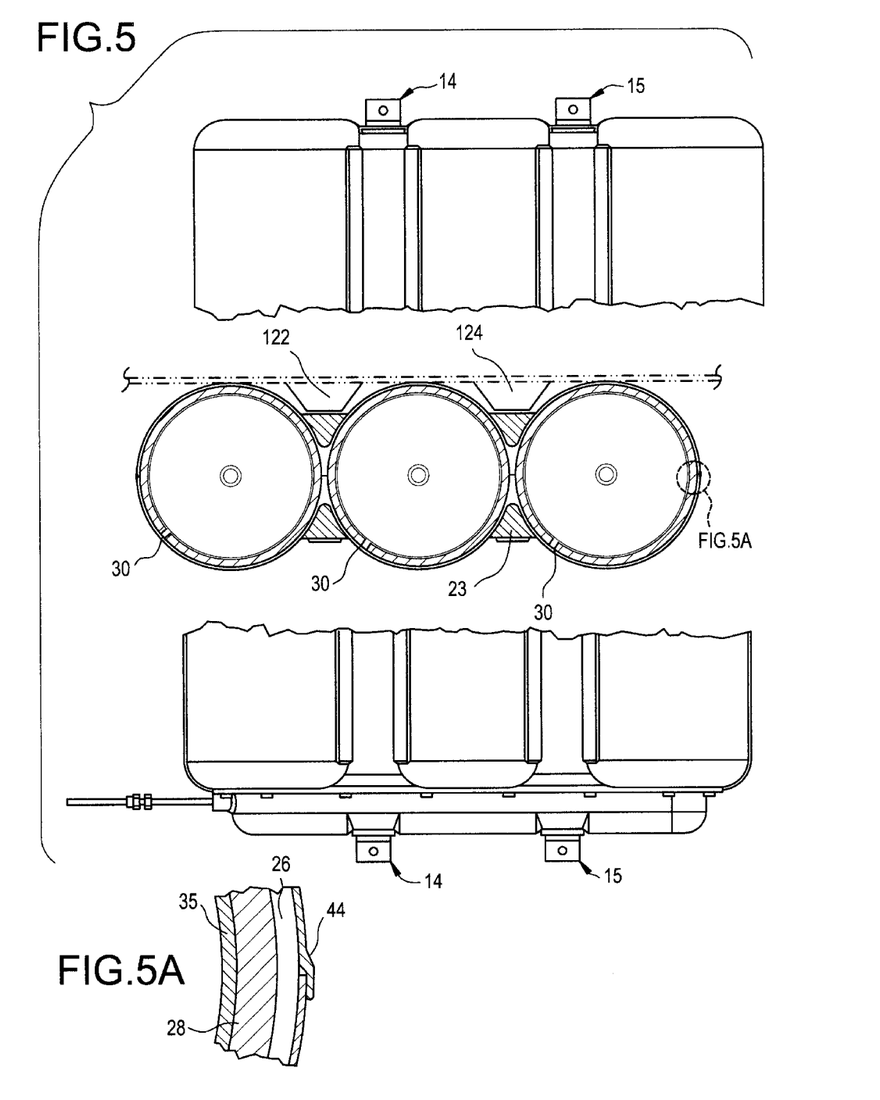
FIG. 5 is a montage of, from the top of the figure to the bottom, a plan view of the end of the invention opposite the gas control assembly, as viewed from the bottom, a plan cut-away view of the invention taken along the line A—A of FIG. 3 as it is installed on the undercarriage of a vehicle, and a plan view of the gas control assembly end of the invention as viewed from the top.

In the preferred embodiment, isolation is achieved through the relative dimensions of pressure cells and the outer shell combined with the elastomeric interface caps, 33, 34, and shock absorbing, protective foam bumpers, 21, 22, which position the pressure cells within the outer shell and absorb the effects of lengthening of pressure cells during expansion. This relative positioning creates the radial air gap, 26, around each pressure cell, which absorbs the radial expansion of the cell. During storage system filling, pressure induced expansion of pressure cells, is both radial and longitudinal. In alternate embodiments, the air gap, 26, may be replaced by a low density foam or similar material which will compress without applying significant pressure to the interior of the pressure cell container or adjacent pressure cells.

Each pressure cell includes an inlet/outlet port, 31 (FIGS. 4 and 7), consisting of a through hole with threads machined into the end of a metal boss which extends through openings in the shell. Rubber seals/grommets, 19, surrounding the exposed metal bosses of each pressure cell also allow growth in the length direction during pressurization without applying stress to the outer shell and are used to locate the pressure cells in the outer shell. The grommets also act as a seal, preventing water or other debris from collecting within the outer shell air gap, 26.

The system includes an internal vent, best seen in FIG. 4, consisting of a hole, 71, through the outer shell, 10, in the area under the protective cover, 13, and a small atmospheric vent tube, 70, which together allow the air gap around the pressure cells and within the pressure cell container to remain at local atmospheric pressure, allowing the outer shell, 10, to remain in an unstressed state. The atmospheric vent tube, 70, under the protective cover, 13, keeps the space under the protective cover at ambient atmospheric pressure.

An elastomeric gasket, 17, provides a seal between the outer shell, 10, and the gas control assembly protective cover, 13. An elastomeric seal/plug, 18, supports and seals the passage of the thermally activated pressure relief device (PRD) safety vent tube, 74, gas supply tube, 63, distribution manifold solenoid external power wires, 75, and the atmospheric vent tube, 70.

Figure 6:
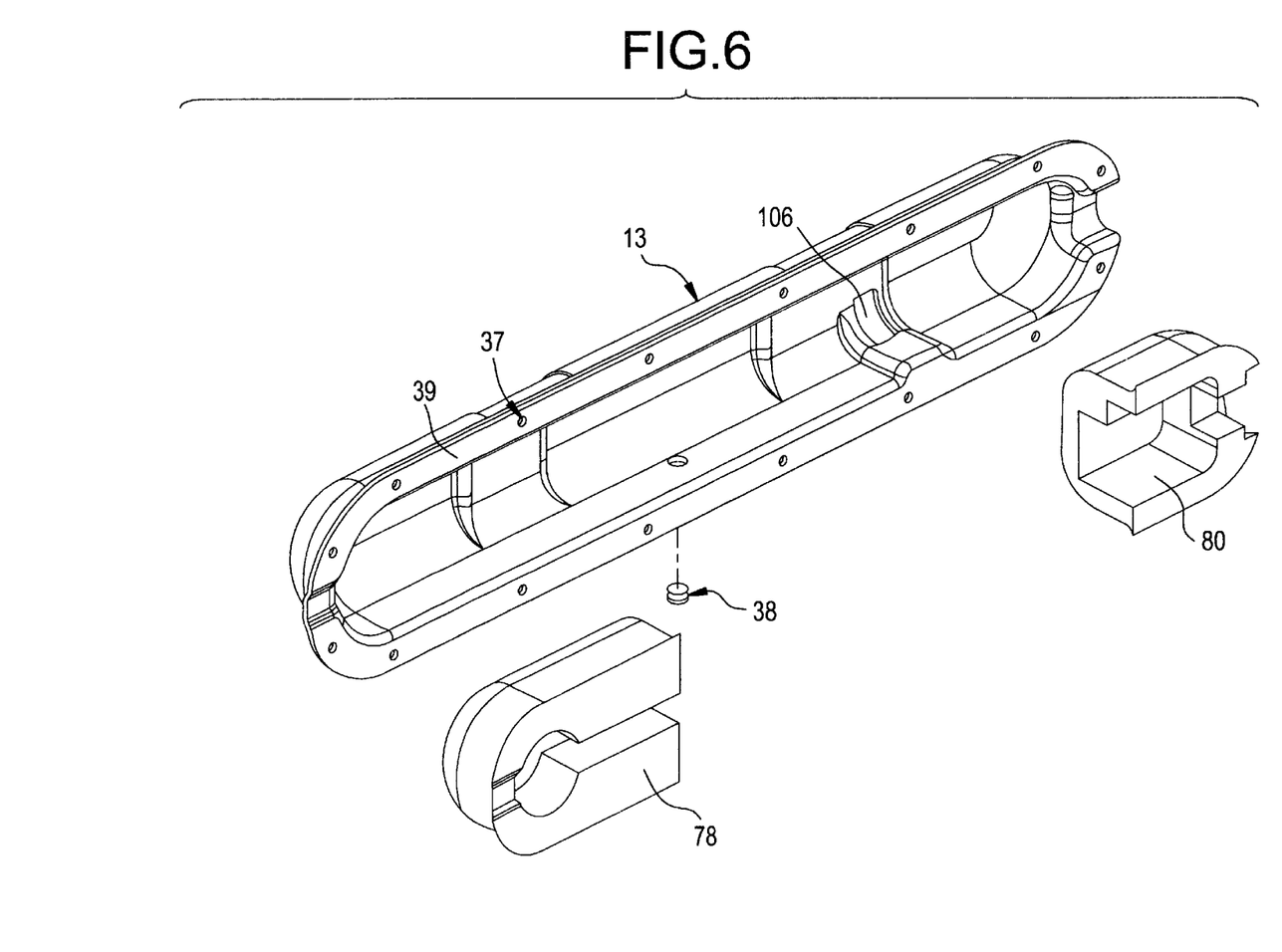
FIG. 6 is a three-quarter exploded view illustrating the interior of the gas control assembly protective cover; the foam protective block supporting the conduit exit end of the gas control assembly; and the foam protective block supporting the end of the gas control assembly at the closed end of the protective cover.

The gas control assembly protective cover, manufactured of molded fiberglass material, allows for ease of servicing of the gas control unit while capturing and venting the flow of any gas leaks. As shown in FIGS. 4 and 6, the protective cover, 13, includes a flange, 39, with bolt holes, 37, that provides a sealing surface for the gasket, 17, and an area to install mounting screws, 82, which serve as the structural connection to the outer shell, 10, and provide the clamping force for the gasket, 17. The protective cover, 13, includes recesses, 102, 104, in its exterior surface, which are dimensioned and located to accommodate the ISS mounting straps, 14 and 15. The protective cover, 13, also includes a gasketed, recessed window, 106, best seen in FIG. 6, to allow the PRD triggers, 88 (FIG. 8) to be thermally exposed to the heat of a fire. The protective cover also includes an access hole with a removable elastomeric sealing plug, 38, to provide access for the manual shut-off. The protective cover has a flat outer surface, 114 of FIG. 3, parallel to the forward surface of the outer shell, to minimize the localized stresses due to impact, such as encountered during the 6 foot drop test required by the above-referenced fuel container standards. Two shock absorbing, protective foam bumpers, 78, 80, of FIG. 6, are installed into the ends of the interior of the gas control assembly protective cover, 13, surrounding and protecting the gas control assembly.

The pressure cells, 30, used in the invention are a variant of commercial compressed natural gas vehicle storage cylinders of Type 3 or 4 construction in accordance with the specifications set forth in ANSI/AGA NGV-2 and are manufactured by Lincoln Composites, Lincoln, Nebr. as part No. R 240049-001. Type 3 composite full-wrapped cylinders consist of a metal liner with continuous filaments of reinforcement fibers in a resin matrix filament wound over the liner. The cylinders are designed such that partial load sharing takes place between the metal liner and the composite overwrap. Type 4 all-composite cylinders, illustrated in cross-section by FIG. 5, have a gas-tight, non-load bearing plastic liner, 35, overwrapped with continuous filaments of reinforcement fibers in a resin matrix, 28. The cylinders are designed such that the composite overwrap takes all the load. Cylindrical pressure cells with near-hemispherical domed ends are used since they are the most efficient and cost effective means of carrying gas under high pressure. This is due to the fact that a pressure vessel with a circular cross section has uniform hoop stresses. A pressure vessel with a non-circular cross section would have higher peak hoop stresses, as well as local bending stresses, which would in turn require a thicker wall and therefore result in a heavier, more expensive pressure cell.

In the preferred embodiment, the pressure cells, 30, (FIG. 5), are of Type 4 design consisting of a hybrid of carbon and E-glass fibers with epoxy resin filament wound over a High Density Polyethylene (HDPE) liner which is molded with an aluminum boss at each end. They are similar to a commercial product in the Type 4 category except that they do not have additional overwraps, coatings, or any other means to afford protection from impact or environmental exposure, since this function is performed by other components of the ISS, namely the energy absorbing foam bumpers and the outer shell, 10. Also, the pressure cells have a closed boss at the aft end, which is flush with the dome surface. The pressure cells meet or exceed all requirements of FMVSS 304 for tests, which include burst, pressure cycling, high temperature creep, stress rupture, and gas permeation. Other pressure cell designs may be incorporated in additional embodiments of the ISS. This could include pressure cells similar to those described above but with an all-carbon overwrap.

The materials for the outer shell, 10, and the gas control assembly protective cover, 13, are selected to protect the pressure cells from the types of environmental exposure required by various NGV fuel container standards. In the preferred embodiment, the upper, 11, and lower, 12, shell sections of the outer shell, 10, and the gas control assembly protective cover, 13, are fabricated from a fiberglass laminate using the Seemann composite resin infusion molding process (SCRIMP) vacuum assisted resin transfer molding technique (U.S. Pat. Nos. 4,902,215, 5,0052,906, and 5,316, 462 incorporated herein by reference). The gas control assembly protective cover, 13, is fabricated in a manner similar to that used to create the upper and lower shell sections except a different fiberglass lay-up and no foam stiffeners are used. The gas control assembly protective cover, 13, is completed by bonding or molding in-place energy-absorbing protective foam bumpers into the end areas.

Figure 8:
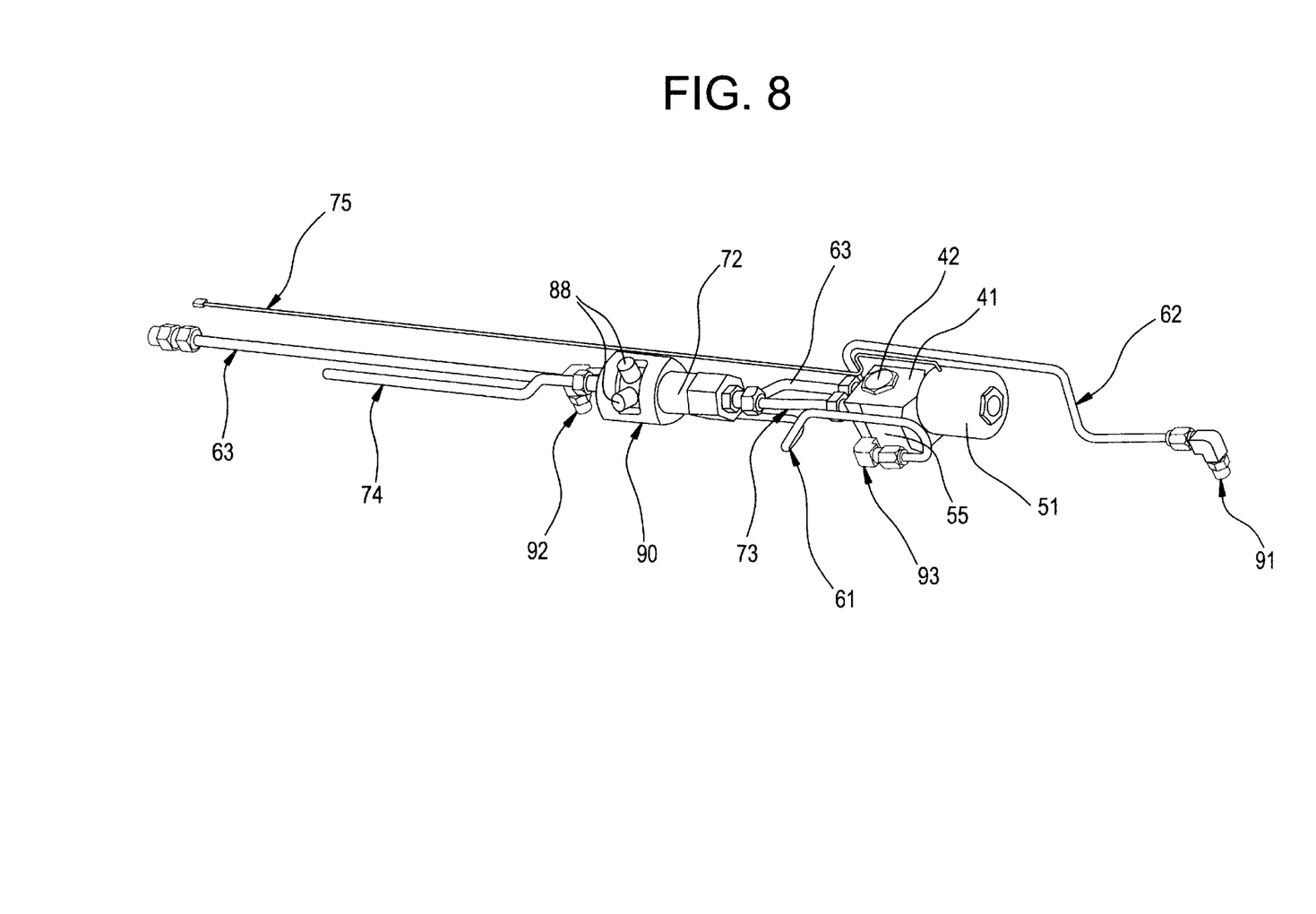
FIG. 8 is a perspective view of the gas control assembly including the distribution manifold, pressure relief device (PRD), pressure cell connectors and related tubing.

As shown in FIG. 8, the gas control assembly is comprised of a distribution manifold, 41, which, in the preferred embodiment, is a machined or cast and turned metal block that interconnects the three pressure cells of the ISS. The manifold, 41, incorporates a valve (not shown) controlled by a solenoid, 51, which is controlled by the vehicle electrical system.

As shown in FIG. 4, the distribution manifold 41 is connected to the inlet/outlet port, 31, of the center pressure cell, 30, and provides an interior gas passage to coupling ports, (not shown) which are connected via conventional high-pressure fittings, 93, (fitting for one coupling port not shown), stainless steel tubing assemblies, 61 and 62, and additional fittings, 91, 92, to the inlet/outlet ports, 31, of the outside of pressure cells, 30. Thus all three pressure cells are pneumatically interconnected by the manifold, 41.

A manual shut-off valve 55 provides a means to stop gas flow from the ISS into the vehicle fuel system via the solenoid valve, 52, and an inlet/outlet port (not shown) in the manifold, 41. The inlet/outlet port is coupled to the vehicle gas flow control and vehicle fuel system by conventional high-pressure fittings and stainless steel tubing assembly, 63. The vehicle may include an ancillary gas flow control system which allows gas flow in a mutually exclusive fashion from the manifold, 41, to the vehicle engine or from a compressed gas supply source into the ISS via the manifold, 41, in a refueling mode.

The manifold, 41, includes a safety vent port (not shown) which is pneumatically coupled to the interior gas passage of the manifold and to thermally responsive safety valve, 72, with triggers, 88, and rubber seal, 90, for the triggers by conventional high-pressure fittings and stainless-steel tubing assembly, 73. The thermally responsive safety valve, i.e., pressure relief device, 72, opens to vent the ISS at a control rate in the event of a vehicle fire involving the fuel storage area. During emergency venting, the fuel escaping from the thermally responsive safety valve, 72, by way of the safety vent tube, 74, will bum if ignited but the resulting flame will be nondestructive due to the location of the opening of the vent tubing assembly which is directed away from the vehicle.

In the preferred embodiment, the pressure cells and their protective housing are assembled through the following steps. The molded protective foam bumpers, 21, 22, are adhesive bonded to the outer shell upper and lower sections, 11, 12. The elastomeric interface caps, 33, 34, are bonded to the dome ends of the three pressure cells with an adhesive/sealant. Adhesive is applied to the outside surfaces of the elastomeric interface caps, 33, 34, on each of the three pressure cells. Rubber seals/grommets, 19, are placed around the pressure cell exposed metal bosses. The pressure cells are placed within the lower shell section, 12, locating the rubber seals/grommets in the slots in the edges of the forward ends of the lower shell section, 12. The upper shell section, 11, is installed over the lower section. An adhesive sealant is applied to the perimeter joint area between the shell sections. While the adhesive/sealant cures, the assembly is secured by a plurality of blind rivets installed through pre-drilled holes in the overlapping edges of the upper and lower shell sections.

The assembly procedure continues with attaching the gas control assembly, 40, to the inlet/outlet ports, 31, in the metal bosses of the pressure cells. An elastomeric gasket, 17, is positioned between the gas control assembly protective cover, 13, and the assembled pressure cell container, 10. Next, the gas control assembly protective cover, 13, is attached over the gasket, 17, to the outer shell, 10, with a plurality of mounting screws, 82, which are threaded into the threaded fasteners, 108, in the upper and lower sections of the outer shell. This encloses the gas control assembly.

Figure 9:
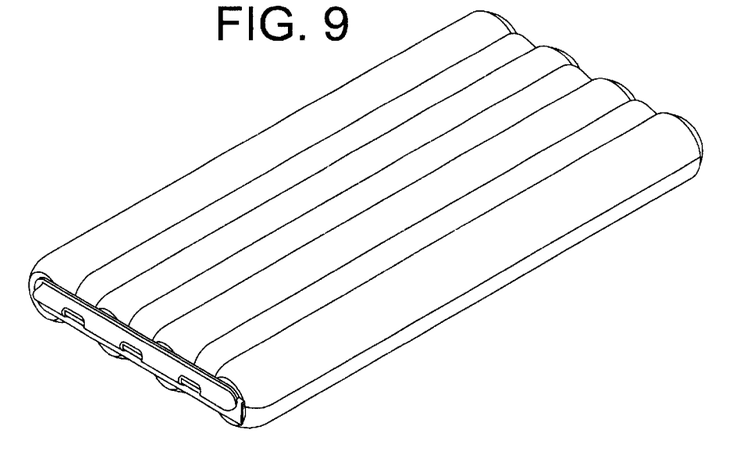
FIG. 9 is a three-quarter perspective view of an alternate embodiment of the invention incorporating four compressed gas pressure cells.
Figure 10:
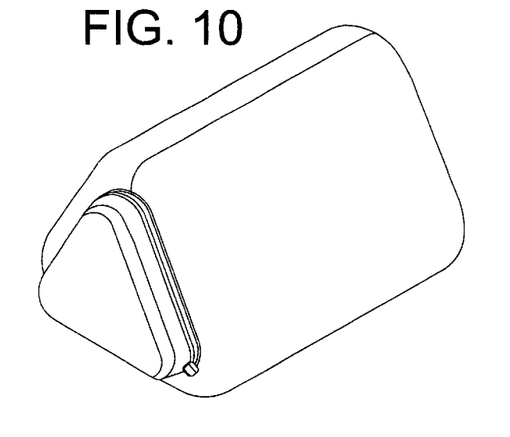
FIG. 10 is a three-quarter perspective view of an alternate embodiment of the invention incorporating a plurality of compressed gas pressure cells arranged to create an assembly with a triangular cross section.
Figure 11:
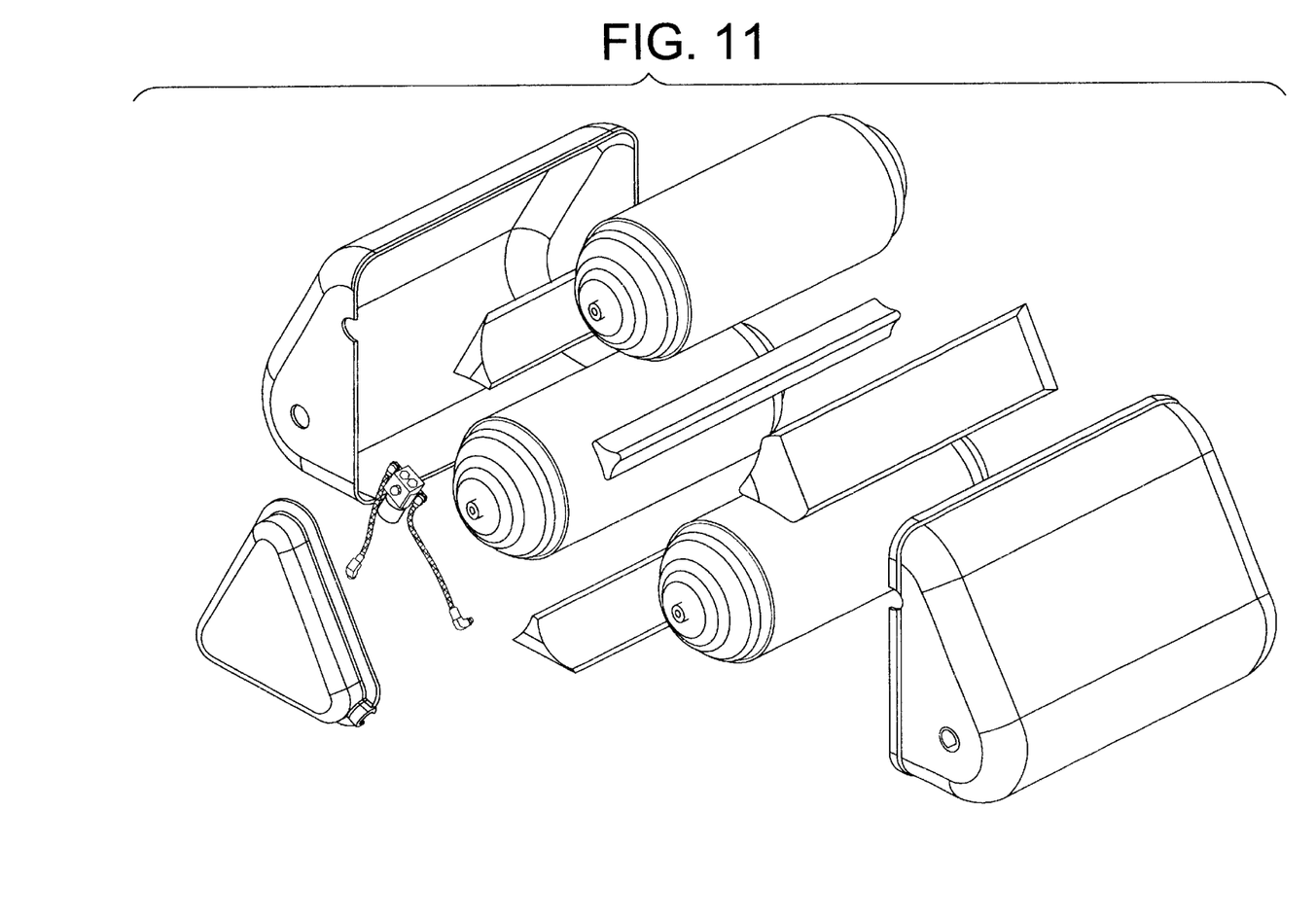
FIG. 11 is an exploded, three-quarter perspective view illustrating the interior of the alternate embodiment of the invention incorporating a plurality of compressed gas pressure cells arranged to create an assembly with a triangular cross section.
Figure 12:
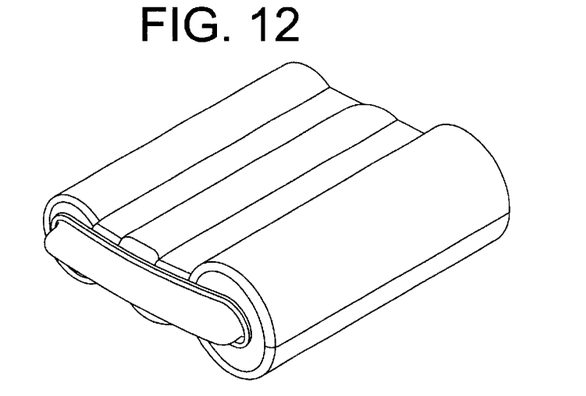
FIG. 12 is a three-quarter perspective view of an alternate embodiment of the invention incorporating a plurality of compressed gas pressure cells having different dimensions to accommodate the space availability requirements of a specific vehicle.

The ISS may be assembled with any number of pressure cells in various configurations. For instance, in a configuration similar to the preferred embodiment, an alternate configuration could use fewer pressure cells of the same or different lengths. Other alternate configurations designed to accommodate vehicle packaging requirements include four pressure cells with a smaller diameter as illustrated in FIG. 9, a triangular arrangement as in FIGS. 10 and 11, or an assembly of pressure cells of different lengths and diameters as in FIG. 12.

The foregoing is considered as illustrative oily of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An integrated compressed gas vehicle fuel storage system, comprising:
   a plurality of compressed gas pressure cells of the type incorporating domed ends and cylindrical bodies;
   a container for said plurality of compressed gas pressure cells, the container having valleys between the adjacent compressed gas pressure cells;
   means for securing said plurality of compressed gas pressure cells within said container and for isolating said plurality of compressed gas pressure cells from each other and from said container, the means for securing and isolating comprising:
      shock absorbing foam bumpers positioned in the ends of said container and dimensioned to cradle the said domed ends of said compressed gas pressure cells; and
      an elastomeric cap positioned between each of said domed ends and said bumpers;
      whereby expansion of one of said compressed gas pressure cells will not apply pressure against adjacent compressed gas pressure cells or the inside of said container;
   a gas control assembly pnemnatically interconnecting said plurality of compressed gas pressure cells; and
   flexible straps for securing said system to a vehicle, the straps laying in the valleys in the container and being attached to the vehicle thereby allowing for deformation of the vehicle chassis for protection of the passenger compartment in the event of a high-impact collision.

2. An integrated compressed gas vehicle fuel storage system as defined by claim 1, wherein said container is a molded structure.

3. An integrated compressed gas vehicle fuel storage system as defined by claim 1, further comprising a protective cover for said gas control assembly fastened to said container.

4. An integrated compressed gas vehicle fuel storage system as defined by claim 3, wherein said container and said protective cover are molded structures.

5. An integrated compressed gas vehicle fuel storage system as defined by claim 2, wherein said container is comprised of mirror image top and bottom halves configured to conform to the shape of said plurality of compressed gas pressure cells.

6. An integrated compressed gas vehicle fuel storage system as defined by claim 5, further comprising:
   valleys formed in the interior of said top and bottom halves between adjacent compressed gas pressure cells; and
   longitudinal triangular stiffeners formed by fiberglass plies that surround rigid foam inserts located within said valleys.

7. An integrated compressed gas vehicle fuel storage system as defined by claim 6, further comprising an overlapping lip joint formed in peripheral mating edges of said top and bottom halves, said overlapping lip joint permitting the top half to be fastened to the bottom half using an adhesive/sealant combined with screws, rivets or other fastening means.

8. An integrated compressed gas vehicle fuel storage system as defined by claim 7, further comprising:
   a plurality of threaded fastening means bonded in said top and bottom halves at said gas control assembly end of said container; and a protective cover for said gas control assembly fastened to said container utilizing said plurality of threaded fastening means.

9. An integrated compressed gas vehicle fuel storage system as defined by claim 7, further comprising:

a plurality of threaded fastening means molded into said top and bottom halves at said gas control assembly end of said container; and a protective cover for said gas control assembly fastened to said container utilizing said plurality of threaded fastening means.

10. An integrated compressed gas vehicle fuel storage system as defined by claim 8, wherein said container and said protective cover are fabricated from a fiberglass laminate using a vacuum assisted resin transfer molding process.

11. An integrated compressed gas vehicle fuel storage system as defined by claim 8, wherein said container is attached and positioned onto the vehicle between flexible straps and channels, the channels being attached to the chassis and fitting within the valley spaces molded into the container outer shell thereby allowing for vehicle chassis deformation in a high-impact collision.

12. An integrated compressed gas vehicle fuel storage system as defined by claim 1, wherein said means for securing and isolating said plurality of compressed gas pressure cells provides a radial space around said bodies of said compressed gas pressure cells and said radial space is dimensioned to prevent said compressed gas pressure cells from contacting adjacent ones of said compressed gas pressure cells or said container when the said compressed gas pressure cells are pressurized.

13. An integrated compressed gas vehicle fuel storage system as defined by claim 12, further comprising means for equalizing the pressure in said container with the exterior pressure.

14. An integrated compressed gas vehicle fuel storage system as defined by claim 13, wherein said radial space is filled with a low-density material.

15. An integrated compressed gas vehicle fuel storage system, comprising:

a plurality of compressed gas pressure cells of the type incorporating domed ends and cylindrical bodies;

a container for said plurality of compressed gas pressure cells;

means for preventing the mechanical coupling of said compressed gas pressure cells or said container, said means for preventing comprising:

shock absorbing means positioned in the ends of said container and dimensioned to cradle the said domed ends of said compressed gas pressure cells; and an elastomeric cap positioned between each of said domed ends and said shock absorbing means; and a gas control assembly pneumatically interconnecting said plurality of compressed gas pressure cells.

16. An integrated compressed gas vehicle fuel storage system as defined by claim 15, wherein said means for preventing the mechanical coupling of said pressure cells or said container comprises a radial space about said cylindrical bodies of said compressed gas pressure cells.

17. An integrated compressed gas vehicle fuel storage system as defined by claim 16, further provides means to equalize the pressure within said container with the outside pressure to avoid stressing said container when said compressed gas pressure cells are pressurized.

18. An integrated compressed gas vehicle fuel storage system as defined by claim 17, wherein said means to equalize the pressure within said container is comprised of an opening and a tube connecting the interior of said container to the ambient atmosphere.

19. An integrated compressed gas vehicle fuel storage system as defined by claim 16, wherein said radial space is filled with a low-density material.

20. An integrated compressed gas vehicle fuel storage system as defined by claim 16, wherein said container comprises:

a molded bottom half;

a molded top half;

said top and bottom halves including walls which are opposing when said halves are assembled as said container; and said opposing walls including a curved section for each one of said plurality of compressed gas cylinders;

whereby the adjoining edges of said curved sections create valley shaped partitions therebetween.

21. An integrated compressed gas vehicle fuel storage system as defined by claim 20, said valleys further comprising longitudinal triangular stiffeners formed by fiberglass plies that surround rigid foam inserts created as part of the molded unitized structure comprising each of said top and bottom halves.

22. An integrated compressed gas vehicle fuel storage system as defined by claim 16, further comprising a protective cover for said gas control assembly fastened to said container.

23. An integrated compressed gas vehicle fuel storage system as defined by claim 22, wherein said container and said protective cover are molded structures.

24. An integrated compressed gas vehicle fuel storage system as defined by claim 21, wherein said top and bottom halves are configured as mirror image structures conforming to the shape of said plurality of compressed gas pressure cells.

25. An integrated compressed gas vehicle fuel storage system as defined by claim 24, further comprising an overlapping lip joint formed in peripheral mating edges of said top and bottom halves, the overlapping lip joint providing a means whereby the upper section may be fastened to the lower section using an adhesive/sealant combined with screws, rivets or other fastening means.

26. An integrated compressed gas vehicle fuel storage system as defined by claim 23, further comprising a plurality of threaded fastening means bonded in said top and bottom halves at said gas control assembly end of said container, whereby said protective cover for said gas control assembly is fastened to said container, utilizing said plurality of threaded fastening means.

27. An integrated compressed gas vehicle fuel storage system as defined by claim 26, wherein said container and said protective cover are fabricated from a fiberglass laminate using a vacuum assisted resin transfer molding process.

28. A vehicle fuel storage system, comprising:

a pressure cell assembly comprised of a plurality of pressure cells, the pressure cells being fabricated by a filament winding process;

a molded protective housing enclosing said pressure cell assembly, said molded protective housing dimensioned to conform to the shape of said pressure cell assembly;

shock absorbing means for positioning said pressure cell assembly within said molded protective housing;

an elastomeric cap positioned between each of said pressure cells and said shock absorbing means, said elastomeric cap and said shock absorbing means providing a radial air space about said pressure cells dimensioned to permit pressure induced expansion of said pressure cells and prevent physical contact there between;

a gas control assembly to pneumatically connect said pressure cells;

a protective cover for said gas control assembly; and means for securing said protective cover to said protective housing.

29. A process for making a vehicle fuel storage system, comprising the steps of:

creating a molded upper integrated storage system outer shell half;

creating a molded lower integrated storage system outer shell half;

bonding pre-molded foam shock absorbing, pressure cell supporting bumpers into the upper and lower integrated storage system outer shell halves;

bonding elastomeric caps to the domed ends of said pressure cells;

enclosing a plurality of pressure cells between the upper and lower integrated storage system outer shell halves with the domed ends of the pressure cells within the foam shock absorbing bumpers;

attaching a gas control assembly to the plurality of pressure cells; and attaching a gas control assembly cover to the upper and lower integrated storage system outer shell halves.

30. A process for making a vehicle fuel storage system, comprising the steps of:

creating a molded upper integrated storage system outer shell half;

creating a molded lower integrated storage system outer shell half;

molding in-place foam shock absorbing, pressure cell supporting bumpers into the upper and lower integrated storage system outer shell halves;

bonding elastomeric caps to the domed ends of said pressure cells;

enclosing a plurality of pressure cells between the upper and lower integrated storage system outer shell halves with the domed ends of the pressure cells within the foam shock absorbing bumpers;

attaching a gas control assembly to the plurality of pressure cells; and attaching a gas control assembly cover to the upper and lower integrated storage system outer shell halves.

31. A process for making a vehicle fuel system as defined by claim 29 or 30, further comprising the step of bonding shock absorbing, pre-molded bumpers in the gas control assembly protective cover.

32. A process for making a vehicle fuel system as defined by claim 29 or 30, further comprising the step of molding in-place shock absorbing bumpers in the gas control assembly protective cover.

33. An integrated compressed gas vehicle fuel storage system as defined by claim 12, wherein said storage system can undergo penetration with a high-speed projectile without causing catastrophic rupture of said system.

* * * * *

UNITED STATES PATENT AND TRADEMARK OFFICE
CERTIFICATE OF CORRECTION

PATENT NO. : 6,257,360 B1
DATED : July 10, 2001
INVENTOR(S) : John J. Wozniak, Dale B. Tiller, Paul D. Wienhold and Richard J. Hildebrand It is certified that error appears in the above-identified patent and that said Letters Patent is hereby corrected as shown below:

Title page,
Item [63] Assignee, insert the following additional Assignee:
Technical Products Group Incorporated
Lincoln, Nebraska (US)

Column 11,
Line 59, delete "comprises" and insert therefor -- provides --.
Line 62, delete "provides" and insert therefor -- comprising --.

Column 12,
Line 46, delete "23" and insert therefor -- 25 --.

Signed and Sealed this

Fifth Day of March, 2002

Attest:

JAMES E. ROGAN
Attesting Officer
Director of the United States Patent and Trademark Office